(12) United States Patent
Halasz et al.

(10) Patent No.: US 7,451,316 B2
(45) Date of Patent: Nov. 11, 2008

(54) METHOD AND SYSTEM FOR PRE-AUTHENTICATION

(75) Inventors: David E. Halasz, Stow, OH (US); Nancy Cam Winget, Mountain View, CA (US); Robert C. Meier, Cuyahoga Falls, OH (US)

(73) Assignee: Cisco Technology, Inc.

( * ) Notice: Subject to any disclaimer, the term of this patent is extended or adjusted under 35 U.S.C. 154(b) by 692 days.

(21) Appl. No.: 10/891,924

(22) Filed: Jul. 15, 2004

(65) Prior Publication Data

US 2006/0013398 A1      Jan. 19, 2006

(51) Int. Cl.
*H04L 9/00* (2006.01)
(52) U.S. Cl. ............................ 713/171; 713/168; 380/47
(58) Field of Classification Search .................. None
See application file for complete search history.

(56) References Cited

U.S. PATENT DOCUMENTS 5,940,508 A * 8/1999 Long et al. ................. 380/273
7,243,234 B2 * 7/2007 Newkirk ..................... 713/171
7,245,724 B1 * 7/2007 Chesson et al. ............. 380/270

* cited by examiner

*Primary Examiner*—Pramila Parthasarathy
(74) *Attorney, Agent, or Firm*—Tucker Ellis & West, LLP

(57) ABSTRACT

A wireless station prepares to roam by pre-authenticating itself with a neighboring access point. The wireless station sends a rekey request, which can include an incremented rekey number. The wireless station receives a rekey response. The rekey response can include the incremented rekey number. Because the wireless station is pre-authenticated, after it roams it only needs to perform a two-way handshake with a new access point to establish secure communications with the new access point. The two-way handshake starts by the wireless station sending a reassociation request to the neighboring access point, the reassociation request comprising the incremented rekey number established during pre-authentication. The wireless station receives a reassociation response from the neighboring access point. To protect against replay attacks, the neighboring access point can verify the rekey number sent in the reassociation request matches the rekey number sent in the rekey response.

30 Claims, 5 Drawing Sheets

METHOD AND SYSTEM FOR PRE-AUTHENTICATION

CROSS-REFERENCE TO RELATED APPLICATIONS

This application is related to U.S. patent application Ser. No. 10/417,653 filed on Apr. 17, 2003, published as U.S. Patent Application Publication No. 2004/0103282 the contents of which are hereby incorporated by reference.

BACKGROUND OF THE INVENTION

The present invention relates generally to wireless networking and more particularly to systems and methods for establishing a connection between a wireless station and an access point as the wireless station roams to a new access point.

The Institute for Electrical and Electronic Engineer's (IEEE) 802.11i draft standard defines a protocol (802.11i protocol) for establishing mutual authentication and unicast group keys between a wireless client (802.11i station) and its parent access point (AP). The 802.11i protocol uses a 4-way handshake to verify session liveliness, to establish a unicast key and to establish a group key. The 802.11i protocol adds four additional messages to the existing four IEEE 802.11 protocol reassociation and authentication messages, each time a 802.11i station roams. Therefore, an 802.11i station must exchange a minimum of eight messages with its new parent AP whenever it roams, before it can resume normal data communications. These eight messages are sent without using Quality of Service (QoS) protocols such as the IEEE 802.11e (QoS) protocol and can be delayed due to channel contention and processing overhead. The resulting delay can be unacceptable for time sensitive applications such as interactive voice.

The Cisco Central Key Management (CCKM) security protocol, available from Cisco Systems, Inc., 170 West Tasman Dr., San Jose, Calif. 95134 enables an 802.11 station to quickly re-authenticate and establish a new session between a client and a new parent access point (AP). When a CCKM compliant station reassociates with a new parent access point, it uses a 2-way handshake to establish a new secure session with corresponding unicast and multicast message protection keys, and mutual authentication with the new access point. The CCKM 2-way handshake is "piggybacked" on existing 802.11 Reassociation Request and Reassociation Response messages; therefore, CCKM "fast reauthentication" does not add any extra messaging overhead to roaming. A CCKM station can generate a new data encryption key, and other credentials, for a new parent AP, before it breaks its connection with an old parent AP.

A CCKM Rekey Number (RN) is stored in an 802.11 station and in a central entity referred to as a Wireless Domain Server (WDS) that functions as an authentication server. Cisco WDSes cache security context and other operational context information (e.g. IP mobility bindings) for 802.11 stations. Whenever a station roams, a Wireless Domain Server securely forwards the station's operational context to the new parent AP. An "Anchor Wireless Domain Server" stores the master copy of a station's operation context information. The context information is cached in other "foreign WDSes" so that roaming is "localized". Each AP mutually authenticates and establishes a "Context Transfer Key" with a Wireless Domain Server. The Rekey Number is incremented by the 802.11 station each time that it establishes a new secure session with a parent AP. The Rekey Number is then forwarded to the Wireless Domain Server in a "Rekey Request", which is authenticated with a Key Request Key (KRK) shared by the 802.11 station and the Wireless Domain Server. A Rekey Request is invalid and is rejected if the Rekey Number in the Rekey Request is not greater than the Wireless Domain Server's current Rekey Number value for the 802.11 station; therefore any Rekey Request that is "replayed" by an attacker will be rejected.

While the CCKM protocol reduces the messaging when an 802.11 station roams, it requires a new parent AP to access a Wireless Domain Server each time that a station reassociates. This results in additional traffic between the parent AP and the Wireless Domain Server each time a station reassociates. Furthermore, the communication between the new parent AP and the Wireless Domain Server adds to the latency in establishing the connection between the wireless station and the new parent AP.

There are several fast re-authentication proposals for 802.11i stations, where a station's security credentials are "predictively" forwarded to other "neighbor" APs so that, when a station roams to a neighbor AP, the new AP does not need to obtain the station's security credentials. However, it may not be practical to "predictively" forward a station's security credentials, which can include a Rekey Number, to a neighbor AP because the station's Rekey Number will likely be "out-of-sync" if the station eventually roams to the neighbor AP. It would be necessary to predictively forward the station's credentials to every neighbor AP each time the station roamed or "rekeyed", which would be very "chatty", resulting in increased network traffic.

In addition, when authenticating a wireless station, the new AP must guard against replay. Replay occurs when an attacker "snoops" packets, and then resends (replays) the packets to gain access to the network.

Therefore, there exists a need for a technique for quickly authenticating a roaming wireless station. Furthermore, it would be desirable if the technique can reduce traffic between access points and central servers, such as Wireless Domain Servers. Also, it would be desirable that the technique offer safeguards to protect against an intruder from accessing the network by replaying a packet.

BRIEF SUMMARY OF THE INVENTION

The present invention relates generally to techniques to pre-authenticate a wireless station and to quickly establish a new session between a wireless client and a new parent access point while roaming. Because the wireless station is already pre-authenticated with the new parent access point, when the wireless station roams to the new access point it reassociates with the new parent access point reducing the number of messages to be exchanged after roaming. The reassociation is a two-way handshake to establish a new secure session, corresponding unicast and multicast message protection keys, and mutual authentication with the new access point. The two-way handshake can be piggybacked on existing IEEE 802.11 standard Reassociation Request and Reassociation Response messages, therefore, the present invention does not add any extra messaging overhead to roaming. The wireless station can generate a new data encryption key, and other credentials, for a new parent access point, before it breaks the connection with an old parent access point.

In accordance with an aspect of the present invention, a client that is associated with a parent AP determines a set of one or more neighboring APs. The client selects a neighboring access point and pre-authenticates itself with the neighboring access point. The client initiates the pre-authentication request by sending a re-key request, prior to roaming, and the client sends a reassociation request after roaming. The client may repeat the process to pre-authenticate with multiple neighbor APs.

The present invention can protect against replay protection by using a rekey number. Replay can occur when an intruder (or attacker) snoops a packet and then resends (replays) the packet. According to an aspect of the present invention, when the client initiates the pre-authentication, the client increments its rekey number, which can also stored at a central repository such as an authentication server. Thus, the rekey number to pre-authenticate is greater than the client's current rekey number with its current parent access point. Thus, the neighboring access point can protect against replay attacks by rejecting any pre-authentication requests where the rekey number is not greater than the client's current rekey number. Alternatively, to enhance against replay attacks, the neighboring access point can allow the rekey number sent in the rekey response to only be used once.

In accordance with an aspect of the present invention, the client drives the pre-authentication process. Thus, access points, wireless domain servers, or other hardware on the backbone do not have to predict which neighboring access points to pre-authenticate the client.

In accordance with an aspect of the present invention, there is disclosed herein a method for roaming from a parent access point to a neighboring access point by a wireless station. The method comprising sending a rekey request, wherein the rekey request comprises an incremented rekey number. The method further comprises receiving a rekey response, wherein the rekey response that comprises the incremented rekey number. The method also comprises sending a reassociation request to the neighboring access point, the reassociation request comprising the incremented rekey number. The method further comprises receiving a reassociation response from the neighboring access point.

In accordance with another aspect of the present invention, there is disclosed herein a system comprising an authentication server, a parent access point; and a neighboring access point, wherein the parent access point and neighboring access point are communicatively coupled to the authentication server over a secure channel. The authentication server is configured to maintain rekey data for a wireless station. The wireless station is associated with the parent access point and can communicate indirectly with the authentication server or the neighboring access point, via the parent access point. The wireless station is configured to send a rekey request, the rekey request comprising an incremented rekey number and an identifier of a neighbor AP. The rekey request is received by one of the parent access point and the neighboring access point, and the rekey request is forwarded to the authentication server for authentication. The neighboring access point is responsive to the authentication server to create a rekey response, the rekey response comprises the incremented rekey number. The rekey response being sent to the wireless station via the authentication server and the parent access point. The wireless station is further configured to send a reassociation request to the neighboring access point, the reassociation request containing the rekey number. The neighboring access point is further configured to receive the reassociation request, verify the reassociation request contains a proper rekey number and to send a reassociation response.

In accordance with an aspect of the present invention, there is disclosed herein a wireless station, comprising means for communicating with a parent access point, means for detecting a neighboring access point, means for pre-authenticating with the neighboring access point by sending a rekey message directed to the neighboring access point, the rekey message containing an incremented rekey number. The wireless station further comprises means for receiving a rekey response that contains the incremented rekey number. The wireless station also comprises means for sending a reassociation request to the neighboring access point, the reassociation request comprising the incremented rekey number, and means for receiving a reassociation response from the neighboring access point.

In accordance with another aspect of the present invention, there is disclosed herein an access point comprising a first transceiver for communicating with a wireless station and a second transceiver for communicating with an authentication server. The access point is responsive to a pre-authentication request containing a rekey number to generate a one time ticket which is encrypted and authenticated with a key known only by the access point, the one time ticket comprising the rekey number and the 802.11 address of the wireless station, and to send the one way ticket, directly or indirectly, to the wireless station. The access point is also configured to receive a reassociation request, which contains the one-time ticket, from the wireless station via the first transceiver and to compare a rekey number from the reassociation request with the rekey number from the pre-authentication request, and to authenticate the one-time ticket using the key known only to the access point, and is responsive to sending a reassociation response when the rekey number from the reassociation request matches the rekey number from the pre-authentication request and the one-time ticket is successfully authenticated.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

DETAILED DESCRIPTION OF INVENTION

Throughout this description, the preferred embodiment and examples shown should be considered as exemplars, rather than limitations, of the present invention. The present invention relates generally to techniques to pre-authenticate a wireless station and to quickly establish a new session between a wireless client and a new parent access point. Because the wireless station is already pre-authenticated with the new parent access point, when the wireless station roams to the new access point it reassociates with the new parent access point. The reassociation is a two-way handshake to establish a new secure session, corresponding unicast and multicast message protection keys, and mutual authentication with the new access point. The two-way handshake can be piggybacked on existing IEEE 802.11 standard Reassociation Request and Reassociation Response messages, therefore, the present invention does not add any extra messaging overhead to roaming. The wireless station can generate a new data encryption key, and other credentials, for a new parent access point, before it breaks the connection with an old parent access point.

Figure 1:
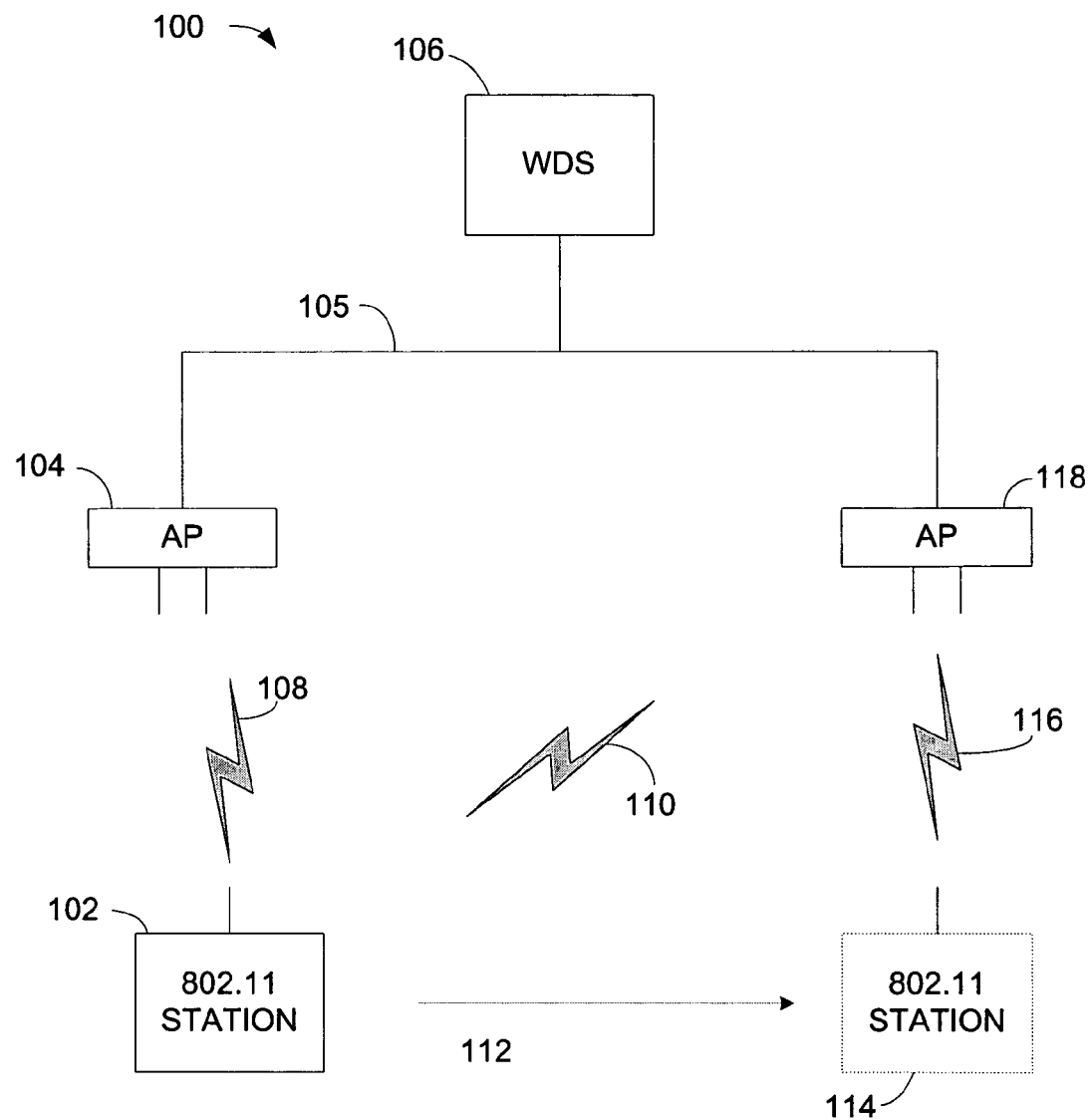
FIG. 1 is a block diagram of a system in accordance with an aspect of the present invention.

FIG. 1 is a block diagram of a system 100 in accordance with an aspect of the present invention. The system 100 comprises a wireless (e.g., 802.11) station at a first location 102, a first access point 104, a second access point and an authentication server 106. The first access point 104, second access point 118 and authentication server 106 are connected by network 105. Network 105 can be a secured network composed of wired connections, but can also have wireless segments as well.

As illustrated, when the wireless station at first location 102, access point 104 is the parent access point and access point 118 is the neighboring access point. Furthermore, while wireless station is at first location 102, it is wireless communicating as shown by 108 with first access point 104 and can wirelessly communicate as shown by 110 with second access point 118. As shown, the wireless station at first location 102 moves along path 112 to second location 114. When the wireless station is at second location 114 communicates wirelessly with neighboring access point 118 as shown by 116, and neighboring access point 118 becomes the wireless station's new parent access point. While the example shown in FIG. 1 shows the wireless station moving along a straight line 112, the path between of the wireless station from first location 102 to second location 114 can move an infinite number of paths.

When the wireless station is at location 102, it can initiate pre-authentication with access point 118 by sending a rekey request. The wireless station at location 102 increments its rekey number prior to sending the rekey request. The rekey request can be sent to either access point 104 (the current parent access point) or access point 118 (currently a neighboring access point). There can be several neighboring access points (not shown). The wireless station can determine which neighboring access point to initiate pre-authentication.

The rekey request is forwarded to authentication server 106 for authentication. If the rekey request is successfully authenticated, a message is sent to the neighboring access point, access point 118 in this example, by authentication server 106. The neighboring access point, access point 118, is responsive to the message from authentication server 106 to create a rekey response, the rekey response can comprise the incremented rekey number. The rekey response can be sent to the wireless station at location 102 via authentication server 106 and the parent access point, access point 104.

After the wireless station roams to the neighboring access point, in this example access point 118 by moving to location 114, the wireless station authenticates itself with the neighboring access point, access point 118, using a two-way handshake. The two-way handshake comprises sending a reassociation request to the neighboring access point, access point 118, which is now the new parent access point. The reassociation request can contain the rekey number. Access point 118 can be configured to receive the reassociation request, verify the reassociation request contains a proper rekey number and to send a reassociation response.

The wireless station can be adapted to determine a set of neighboring access points (not shown) by monitoring beacon frames, monitoring probe frames, receiving a list of neighboring access points from the current parent access point, or any combination of the aforementioned methods.

Neighboring access point 118 can be configured to compare the incremented rekey number sent during the sending the reassociation request with the incremented rekey number sent during the rekey request. If the incremented rekey number sent during the sending a reassociation request matches the incremented rekey number sent during the rekey request, neighboring access point 118 can be configured to send a reassociation response. However, if the rekey number sent during the reassociation request does not match the incremented rekey number sent during the rekey request. neighboring access point 118 can forward the reassociation request to the authentication server 106 for authentication.

In view of the foregoing structural and functional features described above, methodologies in accordance with various aspects of the present invention will be better appreciated with reference to FIGS. 2-5, which explain the methodologies using message exchange diagrams. While, for purposes of simplicity of explanation, the methodologies of FIGS. 2-5 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

Figure 2:
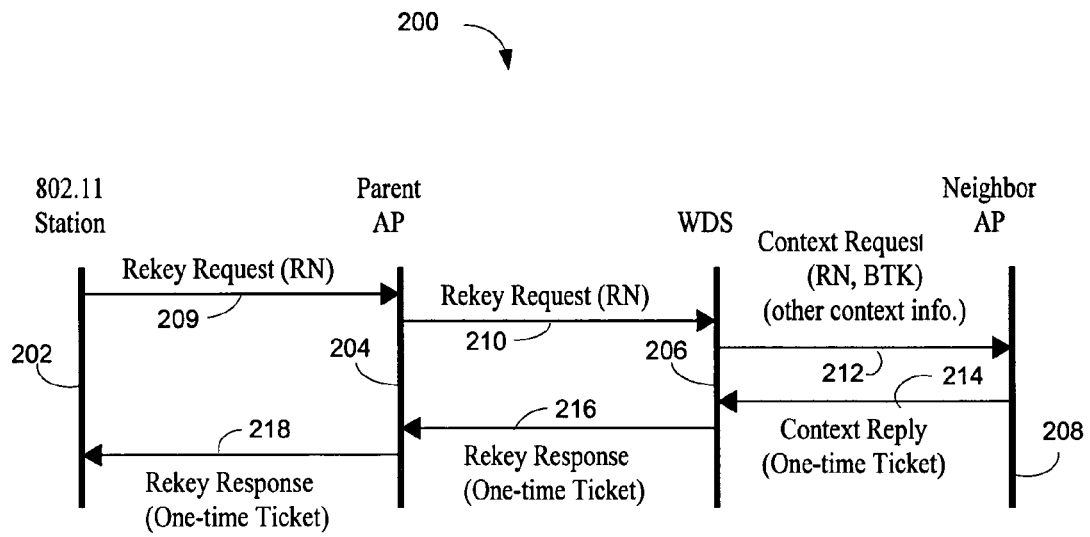
FIG. 2 is a message exchange diagram illustrating the messages sent between various components of a network for a pre-authentication request in accordance with an aspect of the present invention.

FIG. 2 is a message exchange diagram 200 illustrating the messages sent between various components of a network for a pre-authentication request in accordance with an aspect of the present invention. Message exchange diagram 200 illustrates messages sent between a wireless station (e.g. 802.11 station) 202, a parent access point (Parent AP) 204, an authentication server (wireless domain server "WDS") 206 and a neighboring access point (neighbor AP) 208.

Initially, wireless station 202 is associated with parent access point 204. Wireless station 202 can determine a set of neighbor access points, such as neighboring access point 208, by monitoring 802.11 Beacon or Probe Response frames. Optionally, parent access point 204 can advertise a list of neighbor access points, including access point 208, and Beacon timing information. The wireless station can employ one or more factors, including but not limited to, received strength indication (RSSI), channel quality, load and data rate to determine which neighboring access point it is likely to roam to next.

Wireless station 202 initiates pre-authentication with a neighbor access point, e.g., neighboring access point 208, by sending an uplink rekey request to its parent access point 204 as shown at 209. The rekey request can contain the neighboring access point's 208 basic service set identifier (BSSID) and the wireless station's incremented rekey number value. At 210, parent access point 204 securely forwards the rekey request to authentication server 206 for authentication.

The authentication server 202 determines the neighbor access point 208 from an identifier, such as a BSSID, contained in the rekey request and information stored in the authentication server's list of registered access points. Authentication server 206 authenticates the wireless station, and then sends a context request containing a rekey number (RN), a base transient key (BTK) that can be used for deriving pairwise transient keys (PTK) at 212. Optionally the context request can contain other security information for wireless station 202 and/or other context information (e.g., mobility bindings) for wireless station 202. The context request can be authenticated with a secure key shared by the authentication server 202 and the neighbor access point 208.

The neighboring access point 208, generates a context reply that is sent at 214 to authentication server 206. The context reply can include a one time ticket, which is encrypted and authenticated with a key known only by access point 208. The one time ticket can include the rekey number, an authenticator value, and wireless station 202's 802.11 address. The context reply can be authenticated using a secret key shared by the authentication server 202 and the neighbor access point 208.

Figure 3:
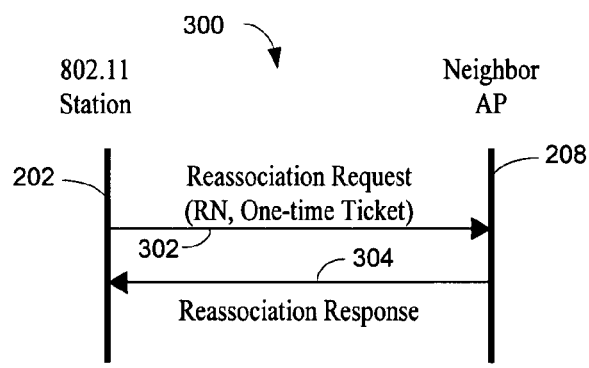
FIG. 3 is a message exchange diagram illustrating the messages sent between a wireless station and an access point for a reassociation request in accordance with an aspect of the present invention.

Authentication server 206 then forwards the one time ticket containing the incremented rekey number in a rekey response to wireless station 202's parent access point 204 at 216. At 218, parent access point 204 forwards the rekey response to wireless station 202. At this point, the pre-authentication message exchanges are complete and wireless station 202 is pre-authenticated with access point 208. It should be noted that wireless station 202 can also pre-authenticate with additional access points (not shown), e.g., a set of neighboring access points, instead of just access point 208, so that it can quickly roam to any one of multiple neighboring access points When wireless station 202 desires to roam to access point 208, wireless station 202 can mutually authenticate itself with access point 208 using a two-way handshake, which is illustrated in FIG. 3, because wireless station is already pre-authenticated using the methodology described in FIG. 2. FIG. 3 is a message exchange diagram 300 illustrating the messages sent between wireless station 202 and access point 208 to reauthenticate wireless station 202 with access point 208 for roaming to access point 208. At 302 wireless station 202 sends a reassociation request to access point 208. The reassociation request can include the incremented rekey number that was sent in the rekey request and the one-time ticket established during pre-authentication. When access point 208 receives the reassociation request with a one-time ticket, it determines if it has matching credentials for the wireless station 202. Access point 208 decrypts and authenticates the one-time ticket with its secret key, and can verify the rekey number value matches the rekey number value established for the station during pre-authentication. If access point 208 has matching credentials for wireless station 202, it can immediately send a reassociation response to wireless station 202. If access point 208 does not have matching credentials for wireless station 202, it can forward the reassociation request to the authentication server 206 (FIG. 2) for authentication. Only allowing a one-time ticket, and the contained rekey number, to be used once protects against replay attacks.

One feature of the methodologies illustrated in FIGS. 2-3 is that when a wireless station roams, it can quickly authenticate with its new parent access point using a two-way handshake. The new parent access point does not need to exchange messages with any other external device to prevent replay attacks. [In other authentication methods, such as the one defined in the IEEE 802.11i standard, replay attacks are avoided by a handshake that includes three or more messages.]

When a wireless station roams to a new access point, the new access point usually has to obtain the wireless station's context information from a local authentication server, or other context server. An aspect of the pre-authentication described herein is that the rekey request can trigger the appropriate server to forward a wireless station's operational context to a likely new parent access point, before the wireless station breaks its connection with an old parent access point, so that the new parent access point will not need to obtain the information after the wireless station roams.

Another feature of the aforementioned methodologies is that the wireless station can restrict the set of neighbor access points to those having acceptable signal quality. Thus, the algorithm for selecting neighboring access points can be much simpler, distributed, and more accurate.

Another feature of the aforementioned methodologies described in FIGS. 2-3 is that the methodologies can work with access points on different subnets. Other pre-authentication methods, such as current IEEE 802.11i Pre-authentication will not work with access points on different subnets.

Figure 4:
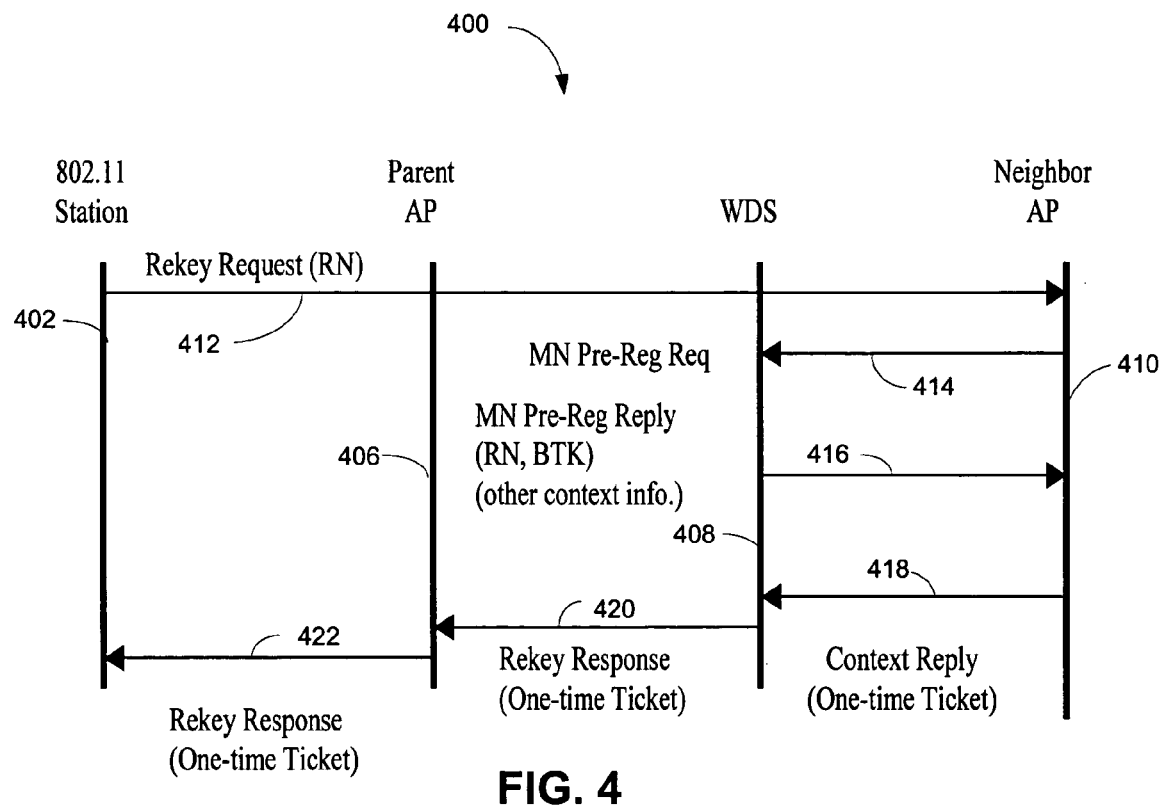
FIG. 4 is a message exchange diagram illustrating the messages sent between various components of a network for a pre-authentication request in accordance with an aspect of the present invention.

Referring now to FIG. 4, there is illustrated a message exchange diagram 400 illustrating the messages sent between various components of a network for a pre-authentication request in accordance with an aspect of the present invention.

Message exchange diagram 400 illustrates messages sent between a wireless station (e.g. 802.11 station) 402, a parent access point (Parent AP) 406, an authentication server (wireless domain server "WDS") 408 and a neighboring access point (neighbor AP) 410.

Initially, wireless station 402 is associated with parent access point 406. Wireless station 402 can determine a set of neighbor access points, such as neighboring access point 410, by monitoring 802.11 Beacon or Probe Response frames. Optionally, parent access point 406 can advertise a list of neighbor access points, including access point 410, and Beacon timing information. The wireless station can employ one or more factors, including but not limited to, received strength indication (RSSI), channel quality, load and data rate to determine which neighboring access point it is likely to roam to next.

Wireless station 402 initiates pre-authentication with access point 410 by sending an uplink rekey request to neighbor access point 410 as shown at 412. The rekey request can contain the neighbor access point 410's basic service set (BSSID) identifier and wireless station 402's incremented rekey number (RN). At 408, the access point 410 sends a mobile node pre-registration request (MN Pre-Reg Req) to authentication server 408. At 416, authentication server 408 sends a mobile node pre-registration reply (MN Pe-Reg Reply) to access point 410. The pre-registration reply can have a rekey number (RN), a base transient key (BTK) that can be used for deriving pairwise transient keys (PTK). Optionally the pre-registration reply can contain other security information for wireless station 402 and/or other context information (e.g., mobility bindings) for wireless station 402.

Access point 410, generates a context reply that is sent at 418 to authentication server 408. The context reply can include a one time ticket, which is encrypted and authenticated with a key known only by access point 410. The one time ticket can include the rekey number, an authenticator value, and wireless station 402's 802.11 address. The context reply can be sent using a secure protocol.

Authentication server 408 then forwards the one time ticket containing the incremented rekey number in a rekey response to wireless station 402's parent access point 406 at 420. At 422, parent access point 406 forwards the rekey response to wireless station 402 at 422. At this point, the pre-authentication message exchanges are complete and wireless station 402 is pre-authenticated with access point 410. It should be noted that wireless station 402 can also pre-authenticate with additional access points (not shown), e.g., a set of access points, instead of just access point 410.

Figure 5:
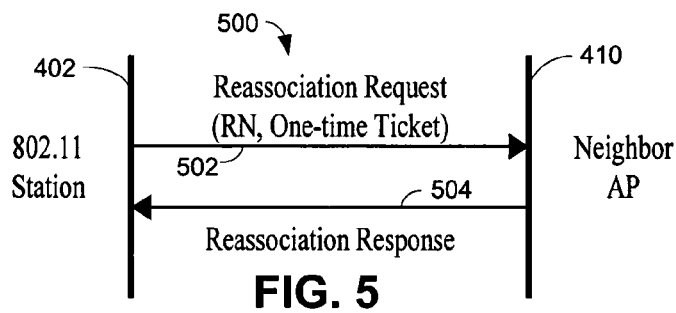
FIG. 5 is a message exchange diagram illustrating the messages sent between a wireless station and an access point for a reassociation request in accordance with an aspect of the present invention.

When wireless station 402 desires to roam to access point 410, wireless station 402 can mutually authenticate itself with access point 410 using a two-way handshake, which is illustrated in FIG. 5, because wireless station is already pre-authenticated using the methodology described in FIG. 4.

FIG. 5 is a message exchange diagram 500 illustrating the messages sent between wireless station 402 and access point 410 to reauthenticate wireless station 402 with access point 410. At 502 wireless station 402 sends a reassociation request to access point 410. The reassociation request can include the incremented rekey number that was sent in the rekey request and the one-time ticket established during pre-authentication. When access point 410 receives the reassociation request with a one-time ticket, it determines if it has matching credentials for the wireless station 402. Access point 410 decrypts and authenticates the one-time ticket with its secret key, and can verify the rekey number value matches the rekey number value established for the station during pre-authentication. If access point 410 has matching credentials for wireless station 402, it can immediately send a reassociation response to wireless station 402. If access point 410 does not have matching credentials for wireless station 402, it can forward the reassociation request to the authentication server 408 (FIG. 4) for authentication. After wireless station 402 makes access point 410 its new parent access point, wireless station 402 increases its rekey number before roaming to another access point.

One feature of the methodologies illustrated in FIGS. 4-5 is that when a wireless station roams, it can quickly authenticate with its new parent access point using a two-way handshake. The new parent access point does not need to exchange messages with any other external device to prevent replay attacks.

When a wireless station roams to a new access point, the new access point usually has to obtain the wireless station's context information from a local authentication server, or other context server. An aspect of the pre-authentication described herein is that the rekey request can trigger the appropriate server to forward a wireless station's operational context to a likely new parent access point, before the wireless station breaks its connection with an old parent access point, so that the new parent access point will not need to obtain the information after the wireless station roams.

Another feature of the aforementioned methodologies is that the wireless station can restrict the set of neighbor access points to those having acceptable signal quality. Thus, the algorithm for selecting neighboring access points can be much simpler, distributed, and more accurate.

Another feature of the aforementioned methodologies described in FIGS. 4-5 is that the methodologies mimic the architecture of IEEE 802.11i standard Pre-authentication. Also, the parent access point does not get computationally involved in the pre-authentication process.

Figure 6:
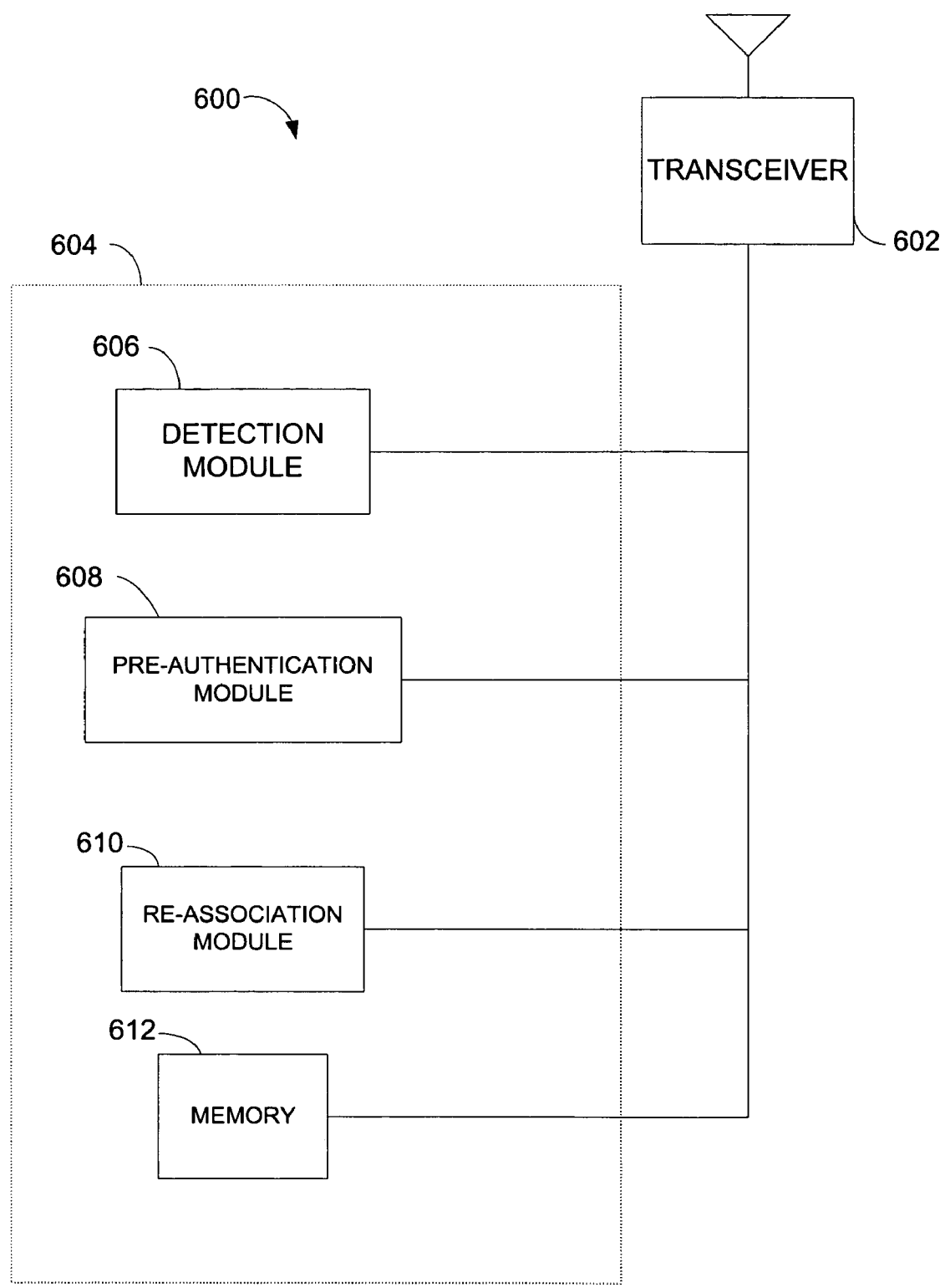
FIG. 6 is a block diagram of a wireless station in accordance with an aspect of the present invention.

FIG. 6 is a block diagram of a wireless station 600 in accordance with an aspect of the present invention. Wireless station 600 comprises a wireless transceiver 602 and a controller 604. Wireless transceiver 602 is used for sending and receiving messages with access points and other wireless stations. Controller 604 can include a central processing unit (CPU) and associated memory 612 for controlling transceiver 602. In addition, controller 604 can have modules, including but not limited to a detection module 606, a pre-authentication module 608 and reassociation module 610 for performing various tasks. These modules 606, 608, 610 can be implemented in hardware, software, or a combination of hardware and software.

Transceiver 602 receives signals which are forwarded to controller 604 and to modules 606, 608 and 610. For example, module 610 can use the signals forwarded by transceiver 602 to detect neighboring access points. Wireless station 600 can determine a set of neighbor access points, by monitoring 802.11 Beacon or Probe Response frames received by transceiver 602. Optionally, a parent access point (not shown) for wireless station 600 can advertise a list of neighbor access points and Beacon timing information which would be received by transceiver 602 and forwarded to detection module 606.

Pre-authentication module 608 can determine which access point, or set of access points to perform pre-authentication. Pre-authentication module 608 can restrict the set of neighbor access points to those having acceptable signal quality, data rates or other criteria. A rekey number can be stored in memory 612 and pre-authentication module 608 can create a rekey request (or rekey message) containing an incremented rekey number. The rekey request is then forwarded to transceiver 602 for wireless transmission. The rekey request can be sent either to the parent access point or to one or more neighboring access points. Pre-authentication module 608 can monitor signals received by transceiver 602 for a rekey response to the rekey request.

After roaming, re-association module 610 can perform authenticating with a new parent access point that was pre-authenticated by pre-authentication module 608. After roaming, re-association module generates a reassociation request that is forwarded to transceiver 602 and sent. The reassociation request can include the incremented rekey number used by pre-authentication module 608 to pre-authenticate with the new parent access point. Re-association module 610 can monitor signals received by transceiver 602 for a reassociation response from the neighboring access point.

Figure 7:
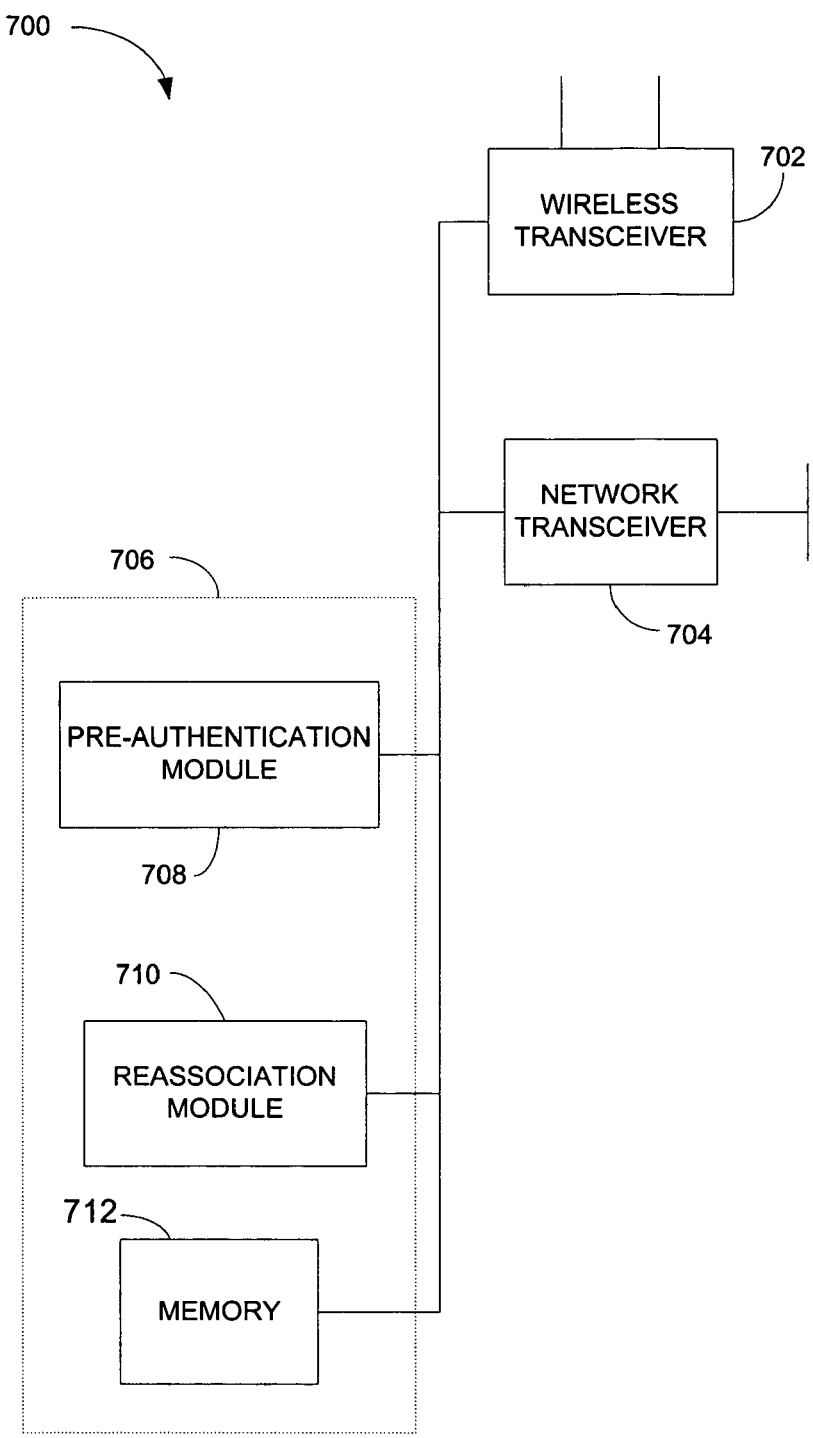
FIG. 7 is a block diagram of an access point in accordance with an aspect of the present invention.

FIG. 7 is a block diagram of an access point 700 in accordance with an aspect of the present invention. Access point 700 comprises a first (wireless) transceiver which can be employed for communicating with a wireless station, a second transceiver or communicating with an authentication server over a separately secured network, and a controller 706 for controlling the operation of transceivers 702, 704. Controller 706 includes a pre-authentication module 708 and a reassociation module 710. Controller 706 can include a central processing unit (CPU) and associated memory 712 for controlling transceivers 702 and 704. Modules 708 and 710 can be implemented in hardware, software, or a combination of hardware and software.

The pre-authentication module 708 is responsive to pre-authentication requests received either from a wireless station via wireless transceiver 702 or from an authentication server via network transceiver 704. The pre-authentication request can have a rekey number value that can be stored in memory 712 for the wireless station requesting pre-authentication. Pre-authentication module 708 then forwards the request via network transceiver 704 to an authentication server (e.g., a WDS). The response from the authentication server is received by network transceiver 704 and forwarded to pre-authentication module 708. If the wireless station is authenticated, the pre-authentication module can generate a one time ticket which is encrypted and authenticated with a key known only by the access point 600. The one time ticket comprising the rekey number and the 802.11 address of the wireless station requesting pre-authentication. Pre-authentication module 708 then sends the one way ticket via network transceiver 704 to the authentication server. Pre-authentication module 708 also stores the rekey number for the wireless station and an identifier for the wireless station such as an 802.11 address in memory 712.

When wireless transceiver 702 receives a reassociation request, the request is forwarded to reassociation module 710. The reassociation request can contain a rekey number. The reassociation module 710 compares a rekey number from the reassociation request with the rekey number for the wireless station from a previous pre-authentication request stored in memory 712. If the rekey number from the reassociation request matches the rekey number from the pre-authentication, then reassociation module 710 generates a reassociation reply message that is sent to wireless transceiver 702 for transmission to the wireless station.

However, if the rekey number from the reassociation request does not match the rekey number from the pre-authentication request, the reassociation module 710 attempts to authenticate the wireless station by sending a message to an authentication server via network transceiver 704. If the wireless station is authenticated, then reassociation module sends a reassociation response to the wireless station via wireless transceiver 702.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. A method for roaming from a parent access point to a neighboring access point by a wireless station, comprising:
    pre-authenticating with the neighboring access point while associated with the parent access point, the pre-authenticating comprises:
        sending a rekey request to the neighboring access point, the rekey request comprises an incremented rekey number, and
        receiving a rekey response to the rekey request, the rekey response comprises a one time ticket that includes the incremented rekey number; and
    roaming to the neighboring access point after pre-authenticating using a two-way handshake with the neighboring access point, the two-way handshake comprises:
        sending a reassociation request to the neighboring access point, the reassociation request comprising the one time ticket, and
        receiving a reassociation response from the neighboring access point.

2. The method of claim 1, further comprising detecting the neighboring access point.

3. The method of claim 1, further comprising selecting the neighboring access point from a plurality of access points.

4. The method of claim 1, further comprising incrementing the rekey number after establishing a new secure session with the neighboring access point.

5. The method of claim 1, further comprising determining a set of neighboring access points by at least one of monitoring beacon frames, monitoring probe frames and receiving a list of neighboring access points from the parent access point.

6. The method of claim 1, further comprising:
    comparing the rekey number sent with the reassociation request with the incremented rekey number sent with the rekey request; and
    sending the reassociation response when the rekey number, sent during the sending a reassociation request, if the rekey number matches the incremented rekey number sent during the rekey request.

7. The method of claim 1, further comprising:
    requesting a context server to transfer context information to the neighboring access point while the wireless station is still associated with the parent access point.

8. The method of claim 1, further sending a rekey request further comprises:
    sending the rekey request to the parent access point
    wherein the rekey request further comprises the basic service set identifier of the neighboring access point.

9. The method of claim 8, the sending a rekey request further comprising:
    forwarding the rekey request from the parent access point to an authentication server;
    authenticating the rekey request by the authentication server; and
    sending a context request message to the neighboring access point;
    wherein the context request messages comprises the incremented rekey number.

10. The method of claim 9, the receiving a rekey response further comprising: creating a rekey response by the neighbor access point, the rekey response comprising the one time ticket that is encrypted and authenticated with a secret key known only by the neighbor access point, the one time ticket containing the rekey number, an authenticator value, and the 802.11 address of the wireless station;
    sending the rekey response to the parent access point via the authentication server; and
    sending the rekey response to the wireless station by the parent access point.

11. The method of claim 10, the sending a reassociation request by the wireless station to the neighboring access point further comprising:
    receiving the reassociation request having the one time ticket by the neighbor access point;
    the neighboring access point decrypting and authenticating the reassociation request one time ticket with the secret key; and
    verifying the incremented rekey value matches the incremented rekey value sent in the rekey request.

12. The method in claim 9 further comprising registering a plurality of access points in a wireless domain with an authentication server for the wireless domain, the registration information provided by each access point includes access point identifiers, a wireless station includes at least one of the registered identifiers for the neighboring access point in the rekey request, and the authentication server identifies the neighboring access point by the identifier included in the rekey request.

13. The method in claim 12 further comprising each access point in the wireless domain establishing a secret key with the authentication server, wherein the secret key is known only by the access point and the authentication server.

14. The method as in claim 13 wherein rekey messages exchanged by the authentication server and the parent access point are authenticated with the secret key shared by the parent access point and the authentication server.

15. The method as in claim 13 wherein context messages exchanged by the authentication server and the neighboring access point are authenticated with the secret key shared by the neighboring access point and the authentication server.

16. The method as in claim 12 further comprising a method where the neighboring access point identifier contained in a rekey request generated by a wireless station is an 802.11 Basic Service Set Identifier (BSSID) of the neighboring access point.

17. The method as in claim 9 further wherein the parent access point and the neighbor access point are on different Internet Protocol (IP) subnets, the further comprising relaying pre-authentication information between the access points on different subnets by an intermediate authentication server.

18. The methods as in claim 17, wherein the registration information provided by each access point includes an IP address.

19. The method as in claim 7, further comprising a wireless station requesting that context information is forwarded to at least one neighboring access points of a the wireless station's parent access point, while the wireless station is still associated with the parent access point.

20. The method as in claim 19, wherein the set of neighboring access points is restricted to those access points to which the wireless station has an acceptable communications link.

21. The method of claim 1, wherein the rekey request is sent to the neighboring access point and includes the basic service set identifier of the neighboring access point, the method further comprising;
  receiving the rekey request by the neighboring access point;
  sending a pre-registration request to an authentication server by the neighboring access point;
  receiving a pre-registration reply from the authentication server by the neighboring access point, the pre-registration reply including the incremented rekey number.

22. The method of claim 21, the receiving a rekey response further comprising:
  creating a rekey response by the neighbor access point, the rekey response comprising the one time ticket that is encrypted and authenticated with a secret key known only by the neighbor access point, the one time ticket containing the rekey number, an authenticator value, and the 802.11 address of the wireless station;
  sending the rekey response to the parent access point via the authentication server; and
  sending the rekey response to the wireless station by the parent access point.

23. The method of claim 22, the sending a reassociation request further comprising:
  receiving the reassociation request having the one time ticket by the neighbor access point;
  decrypting and authenticating the reassociation request one time ticket with the secret key; and
  verifying the incremented rekey value matches the incremented rekey value sent in the rekey request.

24. A system comprising:
  an authentication server, the authentication server configured to maintain rekey data for a wireless station;
  a parent access point; and
  a neighboring access point;
  wherein the wireless station is assigned to the parent access point and can communicate with the neighboring access point;
  wherein the wireless station configured to pre-authenticate with the neighboring access point while associated with the parent access point by sending a rekey request, the rekey request comprising an incremented rekey number;
  wherein the rekey request is received by one of the parent access point and the neighboring access point, and the rekey request is forwarded to the authentication server for authentication by comparing he incremented rekey number with the rekey data;
  wherein the neighboring access point is responsive to the authentication server to create a rekey response, the rekey response comprises a one time ticket that includes the incremented rekey number, the rekey response being sent to the wireless station via the authentication server and the parent access point;
  wherein the wireless station is further configured to roam to the neighboring access point after pre-authentication using a two-way handshake with the neighboring access point, the two-way handshake comprising:
    sending a reassociation request to the neighboring access point, the reassociation request containing the one time ticket; and
    receiving a reassociation response from the neighboring access point; and
  wherein the neighboring access point is further configured to verify the reassociation request contains the one time ticket with the incremented rekey number and to send a reassociation response responsive to verifying the one time ticket sent in the reassociation request has the correct rekey number.

25. The system of claim 24, wherein the wireless station is configured to select the neighboring access point from a plurality of access points.

26. The system of claim 24, further comprising:
  the wireless station adapted to determine a set of neighboring access points by at least one of monitoring beacon frames, monitoring probe frames and receiving a list of neighboring access points from the parent access point.

27. The system of claim 24, further comprising:
  the neighboring access point is further configured to forward the reassociation request to the authentication server when the rekey number sent during the reassociation request does not match the incremented rekey number sent during the rekey request.

28. A wireless station, comprising
  means for communicating with a parent access point;
  means for detecting a neighboring access point;
  means for pre-authenticating with the neighboring access point while associated to the parent access point by sending a rekey message directed to the neighboring access point, the rekey message containing an incremented rekey number;
  means for receiving a rekey response comprising a one time ticket that contains the incremented rekey number;
  means for roaming to the neighboring access point after pre-authentication using a two way handshake with the neighboring access point, the two way handshake comprising:
    means for sending a reassociation request to the neighboring access point, the reassociation request comprising the one time ticket; and
    means for receiving a reassociation response from the neighboring access point.

29. The wireless station of claim 28, wherein the means for pre-authenticating sends the rekey message to one of the group consisting of the parent access point and the neighboring access point.

30. The method of claim 28, further comprising means for selecting the neighboring access point from a plurality of access points.

* * * * *